United States Patent
Chen et al.

(10) Patent No.: US 11,205,308 B1
(45) Date of Patent: Dec. 21, 2021

(54) METHOD AND ELECTRONIC APPARATUS OF MODIFYING THREE-DIMENSIONAL MODEL

(71) Applicant: XRSPACE CO., LTD., Taoyuan (TW)

(72) Inventors: Wei-Ting Chen, Keelung (TW); Tzu-Chiang Wang, New Taipei (TW); Chung-Chih Tsai, New Taipei (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 17/103,962

(22) Filed: Nov. 25, 2020

(51) Int. Cl.
*G09G 5/00* (2006.01)
*G06T 19/00* (2011.01)
*G06T 7/593* (2017.01)
*G06T 19/20* (2011.01)

(52) U.S. Cl.
CPC ............ *G06T 19/006* (2013.01); *G06T 7/593* (2017.01); *G06T 19/20* (2013.01); *G06T 2210/04* (2013.01)

(58) Field of Classification Search
CPC .............................. G06T 19/006; G06T 19/20
See application file for complete search history.

(56) References Cited

U.S. PATENT DOCUMENTS

| | | | | |
|---|---|---|---|---|
| 2012/0092328 | A1* | 4/2012 | Flaks ...................... | G06F 3/012 345/419 |
| 2020/0226820 | A1* | 7/2020 | Stachniak ............... | G06T 19/20 |
| 2020/0312033 | A1* | 10/2020 | Ohashi ............... | G02B 27/0093 |

FOREIGN PATENT DOCUMENTS

| | | |
|---|---|---|
| CN | 110033523 | 7/2019 |
| CN | 111488671 | 8/2020 |
| TW | 700668 | 8/2020 |

OTHER PUBLICATIONS

Helisa Dhamo et al., "Object-Driven Multi-Layer Scene Decomposition From a Single Image", 2019 IEEE/CVF International Conference on Computer Vision (ICCV), Oct. 2019, pp. 5368-5377.
Tomohiro Fukuda et al., "Optical Integrity of Diminished Reality Using Deep Learning", CAAD Education—History, Jan. 2017, pp. 241-250.
Shohei Mori et al., "A survey of diminished reality: Techniques for visually concealing, eliminating, and seeing through real objects", IPSJ Transactions on Computer Vision and Applications, Jun. 2017, pp. 1-14.
"Search Report of Europe Counterpart Application", dated May 31, 2021, pp. 1-7.

* cited by examiner

*Primary Examiner* — Charles Tseng
(74) *Attorney, Agent, or Firm* — JCIP Global Inc.

(57) ABSTRACT

A method and an electronic apparatus of modifying a three-dimensional model are provided. In the method, multiple two-dimensional images are obtained by scanning a real environment Real objects of the real environment are identified in the two-dimensional images. A three-dimensional model is generated based on the two-dimensional images. The three-dimensional model is related to the depth information of the real objects. A modifying operation for modifying one or more virtual objects in the three-dimensional model is received. The virtual objects are corresponding to one or more real objects. The modifying operation is mapped into the two-dimensional images based on the identified result of the real objects in the two-dimensional image and the depth information of the real objects, to generate a modified image. A modified three-dimensional model is generated based on the modified image, to provide a proper modified result.

12 Claims, 3 Drawing Sheets

METHOD AND ELECTRONIC APPARATUS OF MODIFYING THREE-DIMENSIONAL MODEL

BACKGROUND OF THE DISCLOSURE

1. Field of the Disclosure

The present disclosure generally relates to a three-dimensional model generation, in particular, to a method and an electronic apparatus related to a three-dimensional model generation.

2. Description of Related Art

It's convenient for a user to view a three-dimensional model corresponding to a real scene or a real object on a display. The user can change any viewpoint of the three-dimensional model or zoom in/out on areas of interest. Nowadays, a user may use a depth-related camera or a three-dimensional scanner to scan a real scene or a real object. It would not take long to generate a corresponding three-dimensional model can be based on the scanned result.

It should be noticed that the three-dimensional model is recorded in a digital format. Sometimes, a user may use a specific application to modify the three-dimensional model.

However, if the three-dimensional model is modified directly, sometimes, an improper model may be generated. For example, some part of an object is removed from the three-dimensional model because another object, which is located behind, is deleted by the user.

SUMMARY OF THE DISCLOSURE

Accordingly, the present disclosure is directed to a method and an electronic apparatus to provide a modified result.

In one of the exemplary embodiments, a method includes, but is not limited to, the following steps. multiple two-dimensional images are obtained by scanning a real environment Real objects of the real environment are identified in the two-dimensional images. A three-dimensional model is generated based on the two-dimensional images. The three-dimensional model is related to the depth information of the real objects. A modifying operation for modifying one or more virtual objects in the three-dimensional model is received. The virtual objects are corresponding to one or more real objects. The modifying operation is mapped into the two-dimensional images based on the identified result of the real objects in the two-dimensional image and the depth information of the real objects, to generate a modified image. A modified three-dimensional model is generated based on the modified image.

In one of the exemplary embodiments, an electronic apparatus includes, but is not limited to, a memory and a processor. The memory is used to store program codes. The processor is coupled to the memory and loads the program codes to obtain two-dimensional images by scanning a real environment, identify real objects of the real environment in the two-dimensional images, generate a three-dimensional model based on the two-dimensional images, receive a modifying operation for modifying one or more virtual objects in the three-dimensional model, map the modifying operation into the two-dimensional images based on an identified result of the real objects in the two-dimensional images and the depth information of the real objects to generate a modified image, and generate a modified three-dimensional model based on the modified image. The virtual object is corresponding to one or more of the real objects. The three-dimensional model is related to depth information of the real objects.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
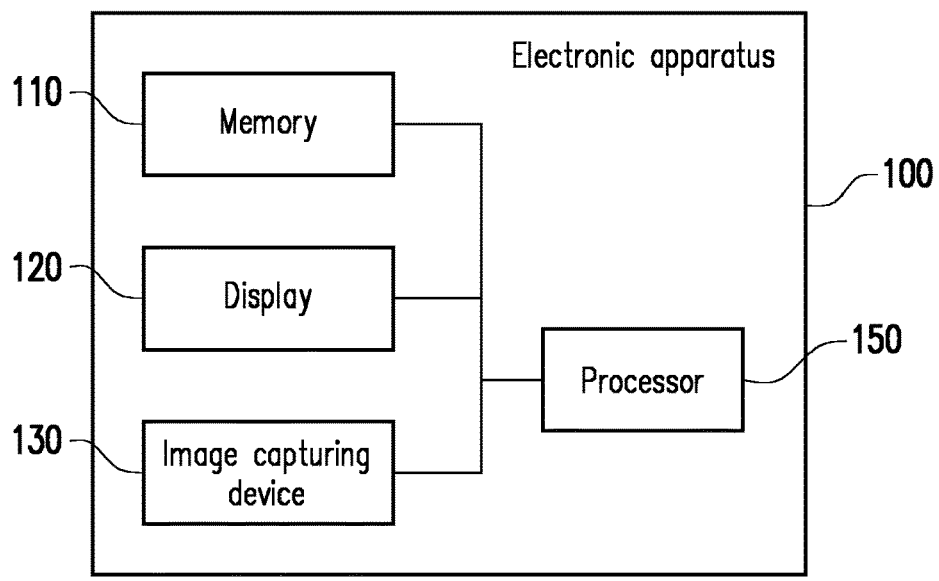
FIG. 1 is a block diagram illustrating an electronic apparatus according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating an electronic apparatus 100 according to one of the exemplary embodiments of the disclosure. Referring to FIG. 1, the electronic apparatus 100 includes, but is not limited to, a memory 110, a display 120, an image capturing device 130, and a processor 150. In one embodiment, the electronic apparatus 100 could be a smartphone, a tablet, a laptop, or a server. In some embodiments, the electronic apparatus 100 is adapted for Extended reality (XR) or other reality related technologies.

The memory 110 may be any type of a fixed or movable random-access memory (RAM), a read-only memory (ROM), a flash memory, a similar device, or a combination of the above devices. The memory 110 records program codes, device configurations, buffer data, or permanent data (such as images, model, depth information, or virtual object materials), and these data would be introduced later.

The display 120 could be an LCD, a LED display, or an OLED display.

The image capturing device 130 could be a camera, such as a monochrome camera or a color camera, a deep camera, a video recorder, or other image capturing devices capable of capturing images. In one embodiment, the image capturing apparatus 130 is disposed at the main body of the electronic apparatus 100 to capture outside. For example, when a user wears the electronic apparatus 100, the image capturing apparatus 130 may be at the position in front of the eyes of the user. In some embodiments, the electronic apparatus 100 may further include a depth sensor, a time-of-flight camera, or other sensors capable of obtaining depth or distance information of external objects.

The processor 150 is coupled to the memory 110, the display 120, and the image capturing device 130. The processor 150 is configured to load the program codes stored in the memory 110, to perform a procedure of the exemplary embodiment of the disclosure.

In some embodiments, the processor 150 may be a central processing unit (CPU), a microprocessor, a microcontroller, a graphics processing unit (GPU), a digital signal processing (DSP) chip, a field-programmable gate array (FPGA). The functions of the processor 150 may also be implemented by an independent electronic device or an integrated circuit (IC), and operations of the processor 150 may also be implemented by software.

In one embodiment, an HMD or digital glasses includes the memory 110, the display 120, the image capturing device 130, and the processor 150. In some embodiments, the processor 150 may not be disposed in the same apparatus with the display 120 and/or the image capturing device 130. However, the apparatuses respectively equipped with the display 120, the image capturing device 130, and the processor 150 may further include communication transceivers with compatible communication technology, such as Bluetooth, Wi-Fi, and IR wireless communications, or physical transmission line, to transmit or receive data with each other. For example, the processor 150 may be disposed in an HMD while the image capturing device 130 is disposed outside the HMD. For another example, the processor 150 may be disposed in a computing device while the display 120 being disposed outside the computing device.

To better understand the operating process provided in one or more embodiments of the disclosure, several embodiments will be exemplified below to elaborate the electronic apparatus 100. The devices and modules in electronic apparatus 100 are applied in the following embodiments to explain the method for modifying a three-dimensional model provided herein. Each step of the method can be adjusted according to actual implementation situations and should not be limited to what is described herein.

Figure 2:
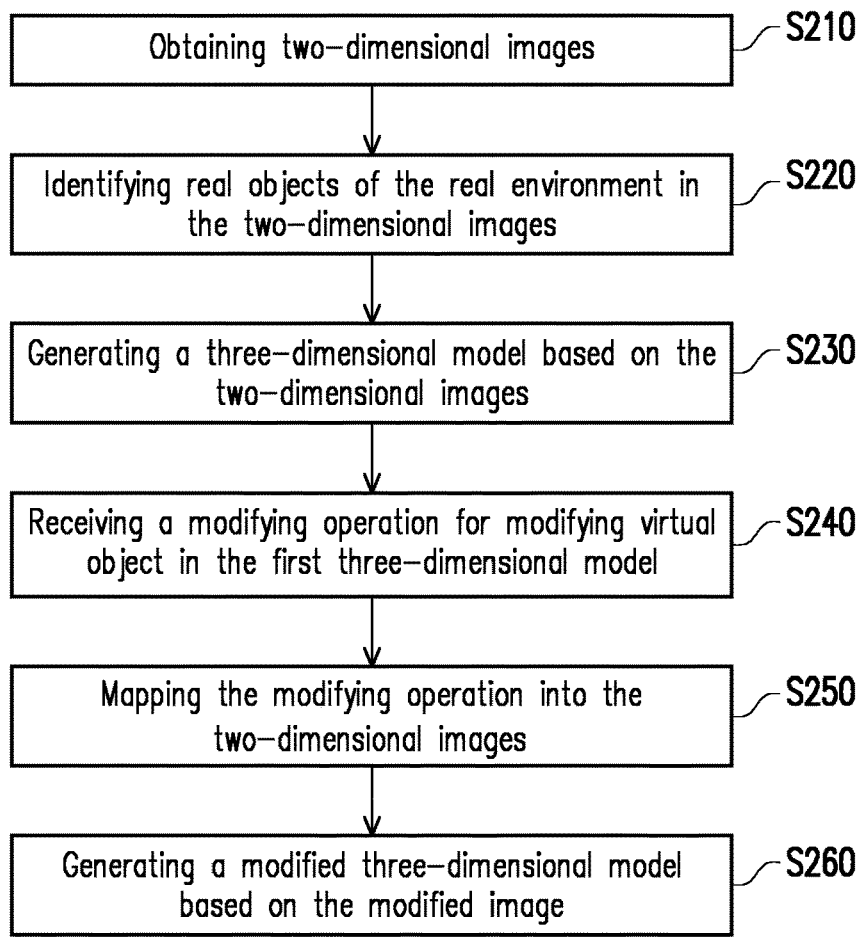
FIG. 2 is a flowchart illustrating a method of modifying a three-dimensional model according to one of the exemplary embodiments of the disclosure.

FIG. 2 is a flowchart illustrating a method according to one of the exemplary embodiments of the disclosure. Referring to FIG. 2, the processor 150 may obtain one or more two-dimensional images by scanning a real environment (step S210). In one embodiment, it is assumed that a user takes/wears the electronic apparatus 100 on his/her body portion. The user may move or rotate the electronic apparatus 100, so that the image capturing apparatus 130 may capture toward a direction corresponding to the pose of the electronic apparatus 100, to scan an architectural space (such as a room or an office) or one or more real objects (such as a chair, a basketball, or a toy) in the real environment. The image captured by the image capturing apparatus 130 in the real environment (such as a room, an office, etc.) would be called the two-dimensional image in the embodiments of the present disclosure, but not limited thereto. In another embodiment, the two-dimensional images are generated by a three-dimensional scanner or a depth-related camera (such as a depth camera, a stereo camera, or a LiDAR scanner), and the electronic apparatus 100 may download or receive the two-dimensional images from an external apparatus (such as a flash disk, a server, or a scanner).

The processor 150 may identify one or more real objects of the real environment in the two-dimensional images (step S220). Specifically, the processor 150 may use the object identification algorithm (such as machine learning-based inference or image feature comparison) to determine the object type of the real objects in the two-dimensional images. For example, several images of chair, table, TV, or bed are considered as training samples to construct an object classifier based on a neural network, and the object classifier can identify the objects in the images.

The processor 150 may generate a three-dimensional model based on the two-dimensional images (step S230). Specifically, the three-dimensional model is related to depth information of the real objects. The depth information may include a relative distance and a relative direction. The relative distance is the distance from a real object to a capturing position of the image capturing device 130 or another scanner where a two-dimensional image is captured. The relative direction is the orientation of the real object relative to the image capturing device 130 or the scanner.

In one embodiment, the processor 150 may generate the three-dimensional model with a model format of the point cloud, 3D mesh, or the likes. It means that the three-dimensional model is made by the model format of point cloud and 3-dimension mesh. Taking the point cloud diagram as an example, the processor 150 obtains features (such as color, line, pattern, etc.) from the two-dimensional image and the depth information of the real objects. The features of the pixels/blocks in the two-dimensional image would be mapped into specific 3D spatial coordinates in a blank virtual environment according to the corresponding depth and position. After all of these pixels/blocks are mapped, the three-dimensional model would be generated.

In another embodiment, the processor 150 may obtain an optimized three-dimensional model with another model format different from the model format of the point cloud. The model format of the optimized three-dimensional model may be STL, FBX, COLLADA, 3DS, OBJ, or other formats.

Figure 3A:
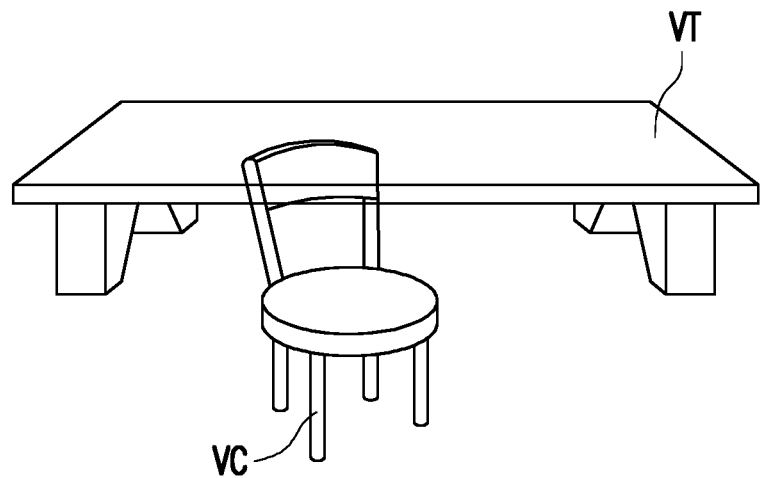
FIG. 3A is a schematic diagram illustrating a three-dimensional model according to one of the exemplary embodiments of the disclosure.

The three-dimensional model includes one or more virtual objects corresponding to one or more real objects in the real environment. For example, FIG. 3A is a schematic diagram illustrating a three-dimensional model according to one of the exemplary embodiments of the disclosure. Referring to FIG. 3A, the three-dimensional model includes a virtual chair VC and a virtual table VT.

The processor 150 may receive a modifying operation for modifying one or more virtual objects in the three-dimensional model (step S240). Specifically, the modifying operation may be related to delete virtual objects from the three-dimensional model or add virtual objects into the three-dimensional model. In one embodiment, regarding the deleting-related modifying operation, the virtual objects are corresponding to one or more real objects captured by the image capturing device 130 or another scanner. In another embodiment, regarding the adding-related modifying operation, the virtual objects are corresponding to one or more real objects not existed in the two-dimensional images.

In one embodiment, the processor 150 may display the three-dimensional model on the display, so that a user may select the to be modified virtual object. For example, the user may use an input device (such as a mouse, a keyboard, or a touch panel) to circle a virtual object in the three-dimensional model. For another example, the user may use the mouse to click at the location of the virtual object.

In another embodiment, the processor 150 may display an object menu on the display 120, and the object menu includes multiple object type. The user may select one or more object types from the object menu.

The processor 150 may map the modifying operation into the two-dimensional images based on the identified result of the real objects in the two-dimensional images and the depth information of the real objects, to generate a modified image (step S250). Specifically, regarding the modifying operation, the processor 150 may establish a two-dimensional image layer relation based on the modifying area and the corresponding image plane. It should be noticed that the depths of multiple virtual objects may be different at a specific view. Sometimes, the modifying operation of one virtual object may affect the completeness of the other virtual objects at the specific view of the three-dimensional model. The two-dimensional image layer relation may help to keep the completeness of the other virtual objects.

In one embodiment, the processor 150 may map a modified area of the modifying operation into an image layer of the two-dimensional images. The image layer is corresponding to a view of the modifying operation on the three-dimensional model. It is assumed the modifying operation is applied at a specific view. Taking FIG. 3A as an example, a user turns the three-dimensional model to the view as shown in the drawing, so that the user can select the virtual table VT for the modifying operation. The modified area is corresponding to an outline of the to-be modified virtual object. It means one or more virtual objects may be added or deleted in the modified area. Therefore, the depth information corresponding to the modified area should be modified for the added virtual object or the deleted virtual object.

Figure 3B:
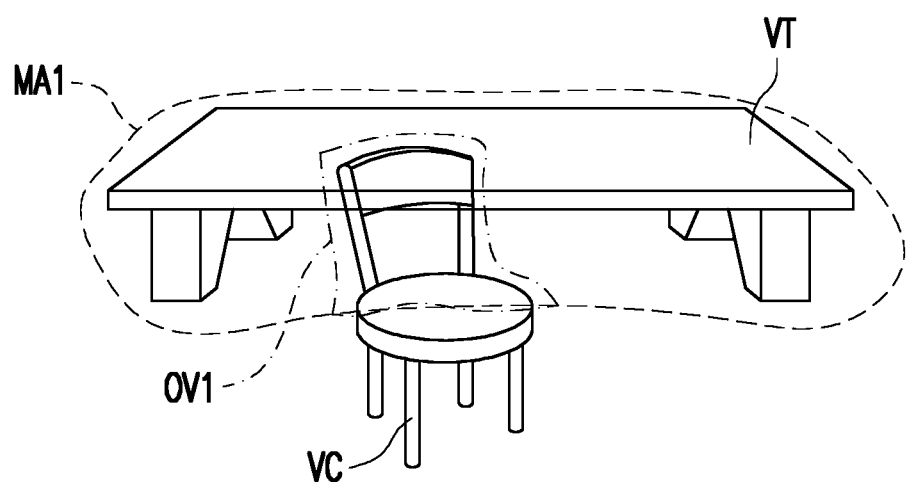
FIGS. 3B-3C are schematic diagrams illustrating a deleting operation of a virtual object according to one of the exemplary embodiments of the disclosure.

For example, FIG. 3B is a schematic diagram illustrating a deleting operation of a virtual object according to one of the exemplary embodiments of the disclosure. Referring to FIG. 3B, the deleting operation is selected for the virtual table VT, and the virtual table VT is circled by the modified area MA1.

Figure 4:
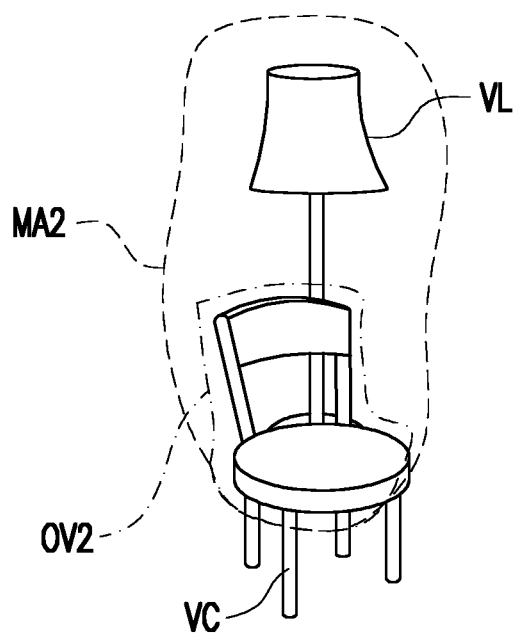
FIG. 4 is a schematic diagram illustrating an adding operation of a virtual object according to one of the exemplary embodiments of the disclosure.

For another example, FIG. 4 is a schematic diagram illustrating an adding operation of a virtual object according to one of the exemplary embodiments of the disclosure. Referring to FIG. 4, the adding operation is selected for the virtual floor lamp VL, and the virtual floor lamp VL is circled by the modified area MA2.

The modified area would be mapped into one image layer. The image layer records the depth information of the real objects captured by the image capturing device 130 or another scanner. Therefore, the processor 150 may determine the depth corresponding to the modified area.

The processor 150 may select the real objects located within the modified area of the image layer based on the identified result of the real objects. Based on the identified result of the real objects, the processor 150 may know whether the modifying area on the three-dimensional model further includes the other real objects which not to be modified. Without the identified result, it may be considered that there is merely one virtual object located within the modified area and result in the incompleteness of the virtual objects. Therefore, all real objects located within the modified area in the image layer should be selected, to further confirm the cover situation among the selected real objects.

For example, a part OV1 of the virtual chair VC is located within the modified area MA1 in FIG. 3B. Furthermore, a part OV2 of the virtual chair VC is located within the modified area MA2 in FIG. 4A.

The processor 150 may generate the modified image based on the depth information of the selected real objects. In the modified image, the whole of the real objects, which are not corresponding to the virtual object selected by the modifying operation, would remain at the same location.

In one embodiment, the modifying operation is to delete the virtual object from the three-dimensional model, i.e., the deleting operation. The virtual objects of the modifying operation are corresponding to one or more first real objects of the selected real objects which are located within the modified area. The processor 150 may determine whether one or more second real objects of the selected real objects are located within the modified area of the image layer based on the depth information of the selected real objects. The second real object is corresponding to one or more virtual objects not selected by the modifying operation. Taking FIG. 3B as an example, the virtual table VT belongs to the first real object, which is a real table in the real environment. The virtual chair VC belongs to the second real object, which is a real chair in the real environment. Based on the identified result, the processor 150 can distinguish two objects. Furthermore, based on the depth information, the processor 150 may know the real chair cover the real table at the view as shown in the drawing.

The processor 150 may delete the modified area from the image layer based on a determined result of the second real object. In one embodiment, the determined result is that determining the second real object is located within the modified area. Taking FIG. 3B as an example, the real chair corresponding to the virtual chair VC is located within the modified area MA1. However, in some situation, the user merely tries to delete the virtual table VT from the three-dimensional model.

The processor 150 may further retain the whole of the second real object in the modified image. It means that a part of the modified area is removed from the image layer, but the other parts, which are occupied by the second real object, is retained. The depth information of the first real object would be abandoned because of the deleting operation. However, the depth information of the part of the second real object located within the modified area would be retained for the completeness of the virtual object corresponding to the second real object.

In some embodiments, after the modified area is deleted from the image layer, the processor 150 may pad the deleted area corresponding to the modified area based on the depth information of a neighboring object. The neighbor object is located at the same depth as the virtual object corresponding to the deleting operation. For example, a table located on the floor is chosen for the deleting operation, and the depth of the deleted area corresponding to the deleted table would be the same as the floor.

In another embodiment, the determined result is that determining the second real object is not located within the modified area. It means that the first real object is not covered by any second real object at the view of the modifying operation. The processor 150 may further delete the whole of the modified area from the image layer. Therefore, merely the depth information of the first real object would be abandoned.

In one embodiment, the modifying operation is to add one or more virtual objects into the three-dimensional model. Similarly, the processor 150 may determine whether a third real object of the selected real objects is located within the modified area of the image layer based on the depth information of the selected real objects. The third real object is corresponding to one or more virtual objects not selected by the modifying operation. Taking FIG. 4 as an example, the virtual chair VC belongs to the third real object, which is a real chair in the real environment.

The processor 150 may generate the depth information of the virtual object corresponding to the adding operation based on the determined result of the second real object. In one embodiment, the determined result is that determining the third real object is located within the modified area. Taking FIG. 4 as an example, the real chair corresponding to the virtual chair VC is located within the modified area MA2. However, the user tries to add the virtual floor lamp VL behind the virtual chair VC.

The processor 150 may further retain the whole of the second real object in the modified image. It means that a part of the modified area would be added in the image layer, but the other parts, which are occupied by the third real object, is retained. The depth information of the newly added virtual object would be generated because of the adding operation. However, the depth information of the part of the third real object located within the modified area would be retained for the completeness of the virtual object corresponding to the third real object.

In another embodiment, the determined result is that determining the third real object is not located within the modified area. It means that the newly added virtual object would not be covered by any virtual object at the view of the modifying operation. Therefore, the depth information of the whole of the newly added virtual object would be generated.

The processor 150 may generate a modified three-dimensional model based on the modified image (step S260). Specifically, in the modified image, the cover situation among the objects located within the modified area is considered. The depth information of the other objects not selected by the modifying operation but located within the modified area remains the same. Furthermore, merely the depth information of the virtual object selected by the modifying operation would be removed or added based on the type of the modifying operation. The processor 150 may use the modified depth information and the two-dimensional images to re-generate the three-dimensional model, and the modified three-dimensional model would be obtained.

Figure 3C:
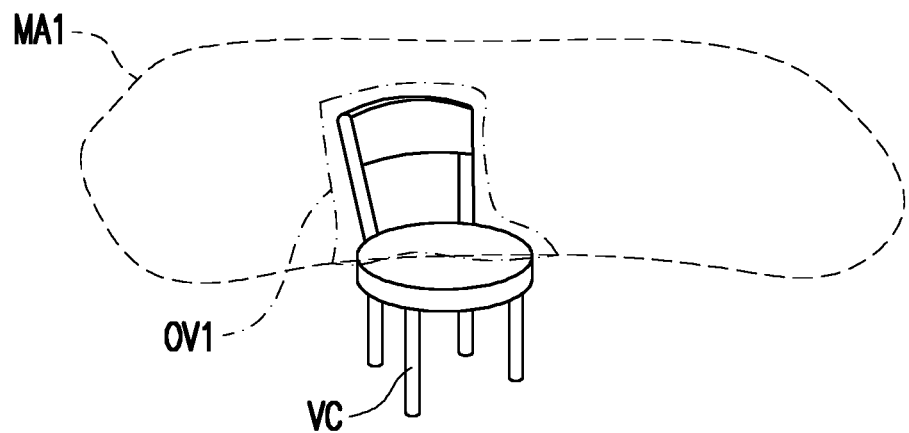

For example, referring to FIGS. 3B and 3C, compared with FIG. 3B, merely the virtual table VT is deleted from the three-dimensional model in FIG. 3C. The whole of the virtual chair VC is retained in the three-dimensional model.

For another example, referring to FIG. 4, the whole of the virtual chair VC is retained in the three-dimensional model. The virtual chair VC further covers the virtual floor lamp VL at the view as shown in the drawing.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method, comprising:
   obtaining two-dimensional images by scanning a real environment;
   identifying real objects of the real environment in the two-dimensional images;
   generating an initial three-dimensional model based on the two-dimensional images, wherein the initial three-dimensional model is related to depth information of the real objects;
   receiving a modifying operation for modifying at least one virtual object in the initial three-dimensional model, wherein the at least one virtual object is corresponding to at least one of the real objects;
   mapping the modifying operation into the two-dimensional images based on an identified result of the real objects in the two-dimensional images and the depth information of the real objects, to generate a modified image for display on a display device, wherein mapping the modifying operation into the two-dimensional images comprises:
      mapping a modified area of the modifying operation into an image layer of the two-dimensional images, wherein the image layer is corresponding to a view of the modifying operation on the initial three-dimensional model, and the modified area is corresponding to an outline of the at least one virtual object;
      selecting the real objects located within the modified area of the image layer based on the identified result of the real objects; and
      generating the modified image based on depth information of the selected real objects; and
   generating a modified three-dimensional model based on the modified image.

2. The method according to claim 1, wherein the modifying operation is to delete the at least one virtual object from the initial three-dimensional model, the at least one virtual object is corresponding to at least one first real object of the selected real objects, and the step of generating the modified image comprises:
   determining whether a second real object of the selected real objects is located within the modified area of the image layer based on the depth information of the selected real objects; and
   deleting the modified area from the image layer based on a determined result of the second real object.

3. The method according to claim 2, wherein the step of deleting the modified area from the image layer comprises:
   determining the second real object is located within the modified area, and further retaining the second real object in the modified image.

4. The method according to claim 2, wherein the step of deleting the modified area from the image layer comprises:
   determining the second real object is not located within the modified area, and further deleting a whole of the modified area from the image layer.

5. The method according to claim 2, wherein after the step of deleting the modified area from the image layer, the method further comprises:
   padding a deleted area corresponding to the modified area based on depth information of a neighboring object.

6. The method according to claim 1, wherein the modifying operation is to add the at least one virtual object into the initial three-dimensional model, and the step of generating the modified image comprises:
   determining whether a third real object of the selected real objects is located within the modified area of the image layer based on the depth information of the selected real objects; and
   generating depth information of the at least one virtual object based on a determined result of the third real object.

7. An electronic apparatus, comprising:
   a memory, storing program codes; and
   a processor, coupled to the memory, and loading the program codes to perform:
      obtaining two-dimensional images by scanning a real environment;
      identifying real objects of the real environment in the two-dimensional pages;

generating an initial three-dimensional model based on the two-dimensional images, wherein the initial three-dimensional model is related to depth information of the real objects;

receiving a modifying operation for modifying at least one virtual object in the initial three-dimensional model, wherein the at least one virtual object is corresponding to at least one of the real objects;

mapping the modifying operation into the two-dimensional images based on an identified result of the real objects in the two-dimensional images and the depth information of the real objects, to generate a modified image for display on a display device, wherein mapping the modifying operation into the two-dimensional images comprises:

mapping a modified area of the modifying operation into an image layer of the two-dimensional images, wherein the image layer is corresponding to a view of the modifying operation on the initial three-dimensional model, and the modified area is corresponding to an outline of the at least one virtual object;

selecting the real objects located within the modified area of the image layer based on the identified result of the real objects; and generating the modified image based on depth information of the selected real objects; and generating a modified three-dimensional model based on the modified image.

8. The electronic apparatus according to claim 7, wherein the modifying operation is to delete the at least one virtual object from the initial three-dimensional model, the at least one virtual object is corresponding to at least one first real object of the selected real objects, and the processor further performs:

determining whether a second real object of the selected real objects is located within the modified area of the image layer based on the depth information of the selected real objects; and deleting the modified area from the image layer based on a determined result of the second real object.

9. The electronic apparatus according to claim 8, wherein the processor further performs:

determining the second real object is located within the modified area, and further retaining the second real object in the modified image.

10. The electronic apparatus according to claim 8, wherein the processor further performs:

determining the second real object is not located within the modified area, and further deleting a whole of the modified area from the image layer.

11. The electronic apparatus according to claim 8, wherein the processor further performs:

padding a deleted area corresponding to the modified area based on depth information of a neighboring object.

12. The electronic apparatus according to claim 7, wherein the modifying operation is to add the at least one virtual object into the initial three-dimensional model, and the processor further performs:

determining whether a third real object of the selected real objects is located within the modified area of the image layer based on the depth information of the selected real objects; and generating depth information of the at least one virtual object based on a determined result of the third real object.

* * * * *